United States Patent
Chen et al.

(10) Patent No.: US 10,483,700 B2
(45) Date of Patent: Nov. 19, 2019

(54) ALL-IN-ONE ELECTRICAL RECEPTACLE CONNECTOR

(71) Applicant: ADVANCED-CONNECTEK INC., New Taipei (TW)

(72) Inventors: Jia Chen, New Taipei (TW); Pin-Yuan Hou, New Taipei (TW); Jia-Qi Li, New Taipei (TW); Hsu-Fen Wang, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 16/051,960

(22) Filed: Aug. 1, 2018

(65) Prior Publication Data
US 2019/0044291 A1 Feb. 7, 2019

(30) Foreign Application Priority Data
Aug. 2, 2017 (CN) .......................... 2017 1 0652950

(51) Int. Cl.
*H01R 13/72* (2006.01)
*H01R 27/00* (2006.01)

(52) U.S. Cl.
CPC ............. *H01R 13/72* (2013.01); *H01R 27/00* (2013.01); *G06F 2213/0042* (2013.01)

(58) Field of Classification Search
CPC .............................. H01R 13/72; H01R 25/162
USPC ................................. 439/211, 248, 740, 730
See application file for complete search history.

(56) References Cited

U.S. PATENT DOCUMENTS

| | | | | |
|---|---|---|---|---|
| 5,454,734 A * | 10/1995 | Eggert | ............... | H01R 23/6873 439/578 |
| 5,584,713 A * | 12/1996 | Kato | .................... | H01R 13/703 200/51.1 |
| 6,368,156 B1 * | 4/2002 | Lin | .................. | H01R 24/58 439/188 |
| 6,461,198 B1 * | 10/2002 | Chao | ....................... | H01R 24/58 439/668 |
| 6,511,329 B2 * | 1/2003 | Yi-Tsung | ................ | H01R 13/52 439/701 |
| 6,699,074 B1 * | 3/2004 | Wu | ........................ | H01R 13/659 439/607.08 |
| 6,869,315 B2 * | 3/2005 | Nakai | ..................... | H01R 24/40 439/668 |
| 6,991,497 B1 * | 1/2006 | Lin | ......................... | H01R 24/58 200/51.1 |

(Continued)

Primary Examiner — Tulsidas C Patel
Assistant Examiner — Peter G Leigh
(74) Attorney, Agent, or Firm — Muncy, Geissler, Olds & Lowe, P.C.

(57) ABSTRACT

An all-in-one electrical receptacle connector includes an audio connector body, an audio connector component, and an electrical connector. The audio connector component is assembled with an audio fixation groove of the audio connector body, and the electrical connector is assembled with a connector fixation groove of the audio connector body. Accordingly, the audio receptacle connector (audio jack) is assembled with receptacle connector(s) with different connection interfaces (e.g., Micro USB, USB type-C, HDMI) to have an all-in-one electrical receptacle connector including the audio receptacle connector and the electrical connector in the electronic product. Therefore, the waterproof function of the housing of the electronic product can be improved effectively.

17 Claims, 9 Drawing Sheets

(56) References Cited

U.S. PATENT DOCUMENTS

| | | | | |
|---|---|---|---|---|
| 7,118,414 B2* | 10/2006 | Spears | G06F 1/182 | 439/540.1 |
| 7,285,024 B1* | 10/2007 | Tai | H01R 24/58 | 439/188 |
| 7,303,432 B1* | 12/2007 | Chen | H01R 13/518 | 439/540.1 |
| 7,344,407 B1* | 3/2008 | Chen | H01R 13/516 | 439/540.1 |
| 7,484,996 B2* | 2/2009 | Ju | H01R 24/58 | 439/541.5 |
| 7,540,769 B1* | 6/2009 | Shen | H01R 13/74 | 439/441 |
| 7,717,755 B2* | 5/2010 | Zhang | H01R 24/58 | 439/669 |
| 7,789,712 B1* | 9/2010 | Peng | H01R 24/58 | 439/668 |
| 7,857,656 B2* | 12/2010 | Tai | H01R 13/50 | 439/485 |
| 7,867,040 B2* | 1/2011 | Yu | H01R 13/518 | 439/701 |
| 7,914,323 B2* | 3/2011 | Hung | H01R 13/514 | 439/540.1 |
| 8,011,952 B1* | 9/2011 | Zhong | H01R 13/506 | 439/540.1 |
| 8,011,961 B2* | 9/2011 | Liu | H01R 4/64 | 439/607.58 |
| 8,123,569 B2* | 2/2012 | Little | H01R 13/52 | 439/669 |
| 8,157,584 B2* | 4/2012 | Zhou | H01R 13/518 | 439/540.1 |
| 8,164,010 B2* | 4/2012 | Zhou | H01R 13/518 | 200/51.02 |
| 8,221,160 B2* | 7/2012 | Liu | H01R 13/6596 | 439/540.1 |
| 8,267,722 B2* | 9/2012 | Zhou | H01R 13/6582 | 439/607.25 |
| 8,277,251 B2* | 10/2012 | Liu | H01R 13/504 | 439/607.04 |
| 8,303,331 B2* | 11/2012 | Yu | H01R 12/7088 | 439/206 |
| 8,353,724 B2* | 1/2013 | Shi | H01R 13/5812 | 439/540.1 |
| 8,512,076 B2* | 8/2013 | Zhang | H01R 13/6596 | 439/607.23 |
| 8,632,351 B2* | 1/2014 | Wu | H01R 13/6315 | 439/248 |
| 8,758,056 B2* | 6/2014 | Zhang | H01R 13/659 | 439/607.01 |
| 8,808,035 B2* | 8/2014 | Wu | H01R 24/58 | 439/668 |
| 8,864,515 B2* | 10/2014 | Oh | H01R 13/5213 | 439/490 |
| 9,225,129 B2* | 12/2015 | Shao | H01R 24/58 | |
| 9,373,911 B2* | 6/2016 | Lo | H01R 13/5202 | |
| 9,444,161 B2* | 9/2016 | Huang | H01R 12/71 | |
| 9,520,685 B2* | 12/2016 | Zhao | H01R 12/721 | |
| 9,559,533 B2* | 1/2017 | Tew | H02J 7/0042 | |
| 9,601,876 B2* | 3/2017 | Jiang | H01R 13/6585 | |
| 9,627,900 B2* | 4/2017 | Zhu | H02J 7/0044 | |
| 9,660,395 B2* | 5/2017 | Yeom | H01R 13/46 | |
| 9,899,756 B2* | 2/2018 | Ootani | H01R 12/721 | |
| 2009/0269977 A1* | 10/2009 | Chen | H01R 13/518 | 439/540.1 |
| 2010/0093219 A1* | 4/2010 | Liu | H01R 4/64 | 439/607.58 |
| 2010/0136825 A1* | 6/2010 | Hung | H01R 13/514 | 439/540.1 |
| 2010/0206702 A1* | 8/2010 | Zhou | H01R 13/518 | 200/51.02 |
| 2010/0291800 A1* | 11/2010 | Liu | H01R 13/518 | 439/607.58 |
| 2011/0111629 A1* | 5/2011 | Peng | H01R 13/518 | 439/607.35 |
| 2013/0309894 A1* | 11/2013 | Geng | H01R 13/625 | 439/345 |
| 2016/0056568 A1* | 2/2016 | Lo | H01R 13/5202 | 439/587 |

* cited by examiner

ALL-IN-ONE ELECTRICAL RECEPTACLE CONNECTOR

CROSS-REFERENCE TO RELATED APPLICATION

This non-provisional application claims priority under 35 U.S.C. § 119(a) to Patent Application No. 201710652950.6 filed in China, P.R.C. on Aug. 2, 2017, the entire contents of which are hereby incorporated by reference.

FIELD OF THE INVENTION

The instant disclosure relates to an electrical receptacle connector, and more particular to an all-in-one electrical receptacle connector.

BACKGROUND

Nowadays electronic devices have many receptacle connectors for mating with plug connectors for different signals. Along with the developments of size-miniaturized electronic products, electrical connectors assembled on the electronic products are popular. These connectors not only have greater signal transmission function but also have features of miniaturized size, simplified structure, and convenience in use. Currently, Universal Serial Bus (USB) receptacle and Audio Jack receptacle have become common input/output interfaces, and can be assembled on speakers or acoustics.

SUMMARY OF THE INVENTION

In an electronic product known to the inventor(s), the audio jack receptacle and the USB receptacle are assembled on the electronic product separately. Since the audio jack receptacle and the USB receptacle are separated, the waterproof function of the housing of the electronic device cannot be properly improved.

In view of this, one or some embodiments of the instant disclosure provide an all-in-one electrical receptacle connector being waterproof. Further, the space in the electronic product can be utilized properly. Hence, the poor waterproof problems come from an electronic product assembled with separated audio receptacle connector and electrical receptacle can be prevented.

An embodiment of the instant disclosure provides an all-in-one electrical receptacle connector comprising an audio connector body, an audio connector component, and an electrical connector. The audio connector body comprises a tubular portion and a protruding block outwardly extending from one of two ends of the tubular portion. An audio insertion groove and a connector insertion groove are on a surface of the protruding block, and the connector insertion groove is adjacent to the audio insertion groove. An audio fixation groove and a connector fixation groove are on the other end of the tubular portion, and the connector fixation groove is adjacent to the audio fixation groove. The audio fixation groove is in communication with the audio insertion groove, and the connector fixation groove is in communication with the connector insertion groove. The audio connector component is at the audio fixation groove, and the electrical connector is at the connector fixation groove.

In one or some embodiments, the surface of the protruding block forms an arced surface, and the audio insertion groove and the connector insertion groove are arranged on the arced surface. Further, the audio fixation groove forms a plurality of audio terminal grooves being in communication with the audio insertion groove, and the audio connector component comprises a plurality of audio terminals assembled in the audio terminal grooves. Alternatively, the audio connector component comprises a housing and a plurality of audio terminals assembled in the housing, and the housing is assembled with the audio fixation groove. Moreover, the audio connector body comprises a plurality of side wings at two sides of the tubular portion.

In one or some embodiments, the all-in-one electrical receptacle connector further comprises a separation board, a printed circuit board, and a flexible board stacked in order. The audio connector component and the electrical connector are one the separation board. Pins are extending from a bottom of the audio connector component and a bottom portion of the electrical connector, and through holes are on the separation board, the printed circuit board, and the flexible board for being inserted by and soldered with the pins. Further, the audio connector body comprises a positioning groove adjacent to a bottom portion of the audio fixation groove and a bottom portion of the connector fixation groove, and the separation board is fixed in the positioning groove. Moreover, the all-in-one electrical receptacle connector further comprises a connection sheet connected to the printed circuit board.

In one or some embodiments, the all-in-one electrical receptacle connector further comprises a waterproof glue at the audio fixation groove and the connector fixation groove for sealing the audio connector component and the electrical connector.

In one or some embodiments, the audio connector body comprises a gasket ring on a surface of the tubular portion, and the gasket ring is around an outer periphery of the protruding block.

Based on the above, according to one or some embodiments of the instant disclosure, the audio receptacle connector (audio jack) is assembled with receptacle connector (s) with different connection interfaces (e.g., Micro USB, USB type-C, HDMI) to have an all-in-one electrical receptacle connector including the audio receptacle connector and the electrical connector in the electronic product. Therefore, the waterproof function of the housing of the electronic product can be improved effectively. Further, as mentioned, the all-in-one electrical receptacle connector further comprises a flexible board. A plurality of wires is disposed on the flexible board (i.e., a flexible circuit board), and one of two ends of the flexible board is inserted into the motherboard of the electronic product. Therefore, because the flexible board is flexible and bendable, the space inside the electronic product can be utilized properly.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
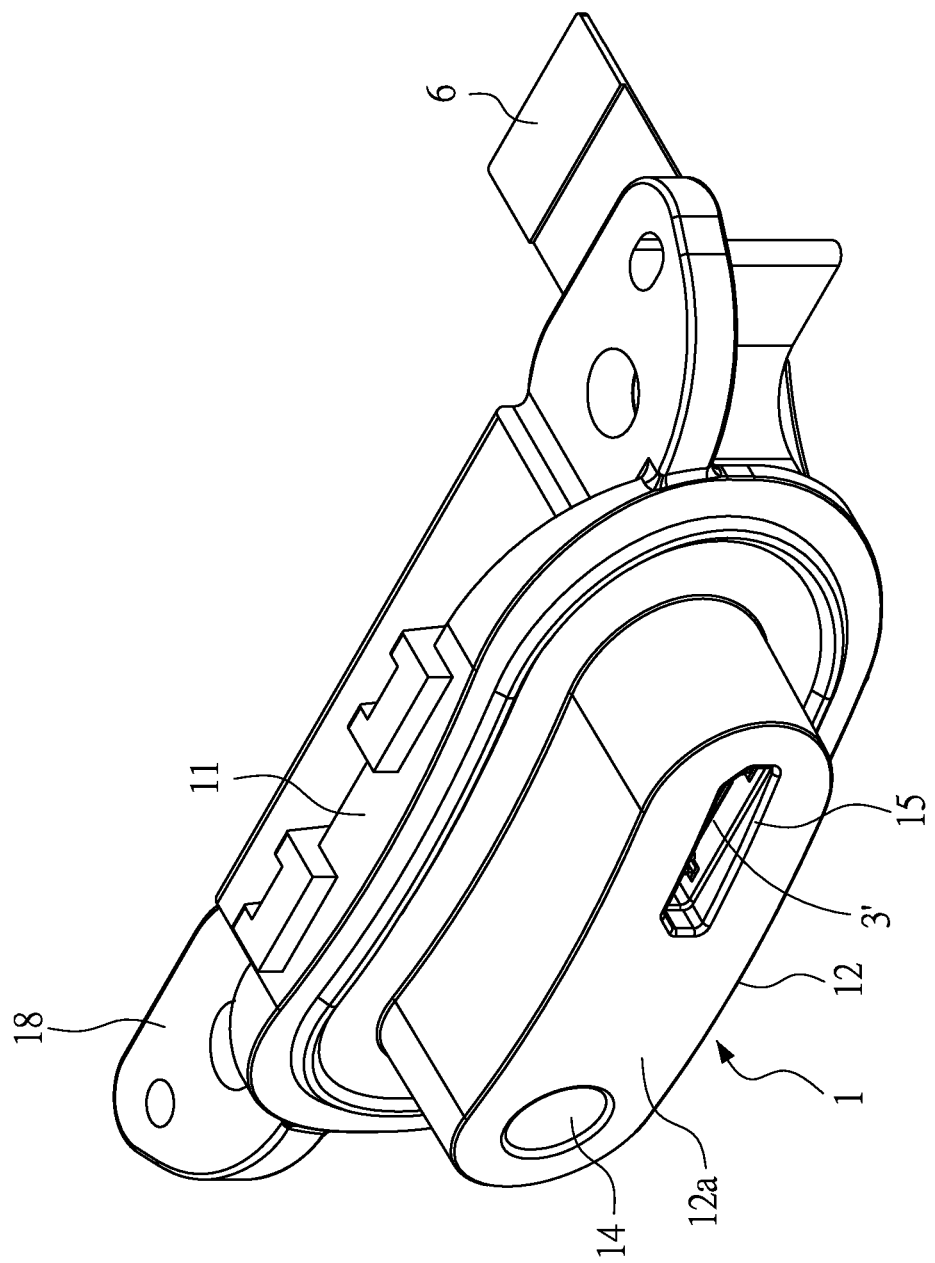
FIG. 1 illustrates a front perspective view of an all-in-one electrical receptacle connector of a first embodiment of the instant disclosure.
Figure 2:
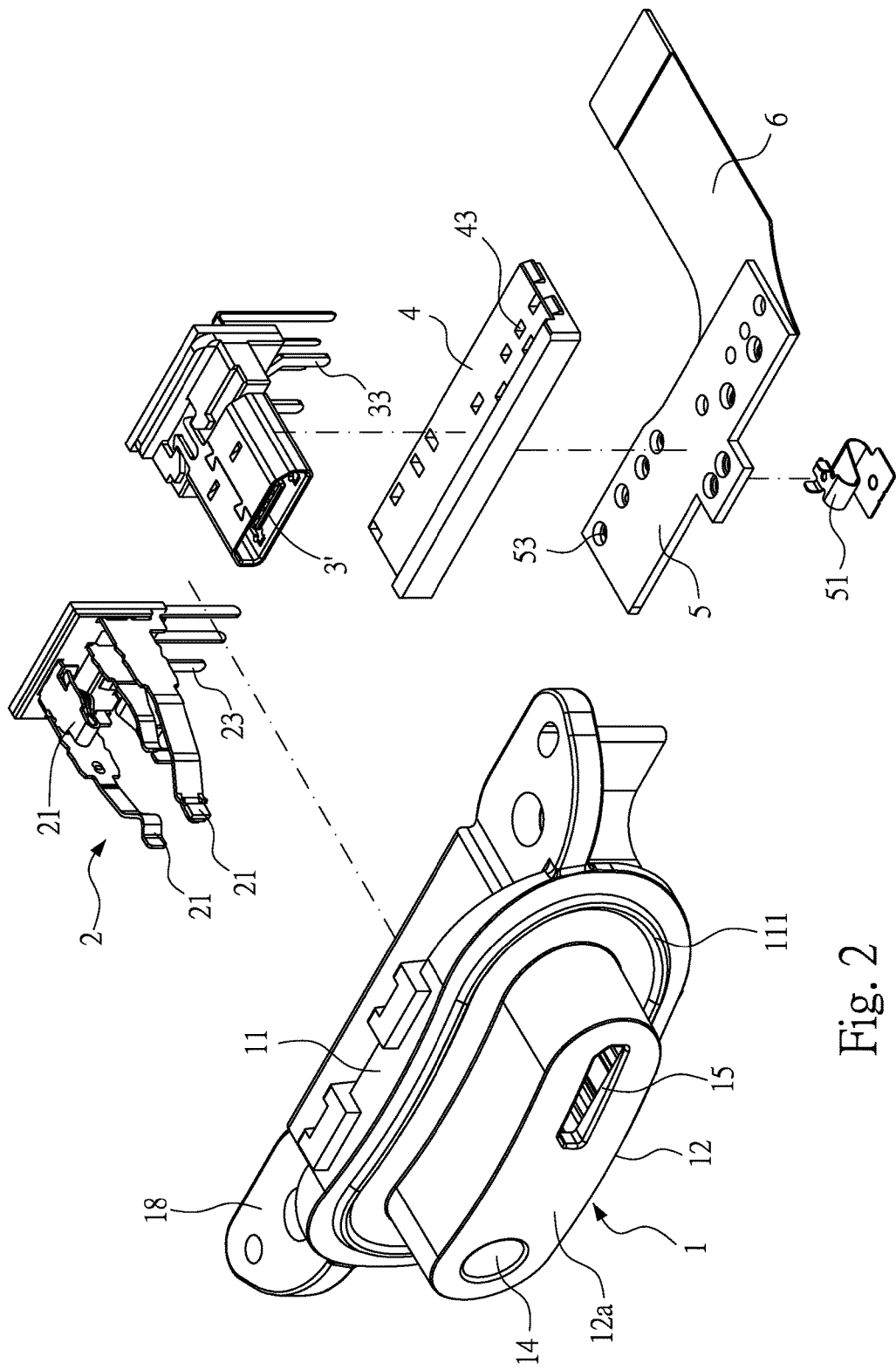
FIG. 2 illustrates an exploded view of the all-in-one electrical receptacle connector of the first embodiment.
Figure 6:
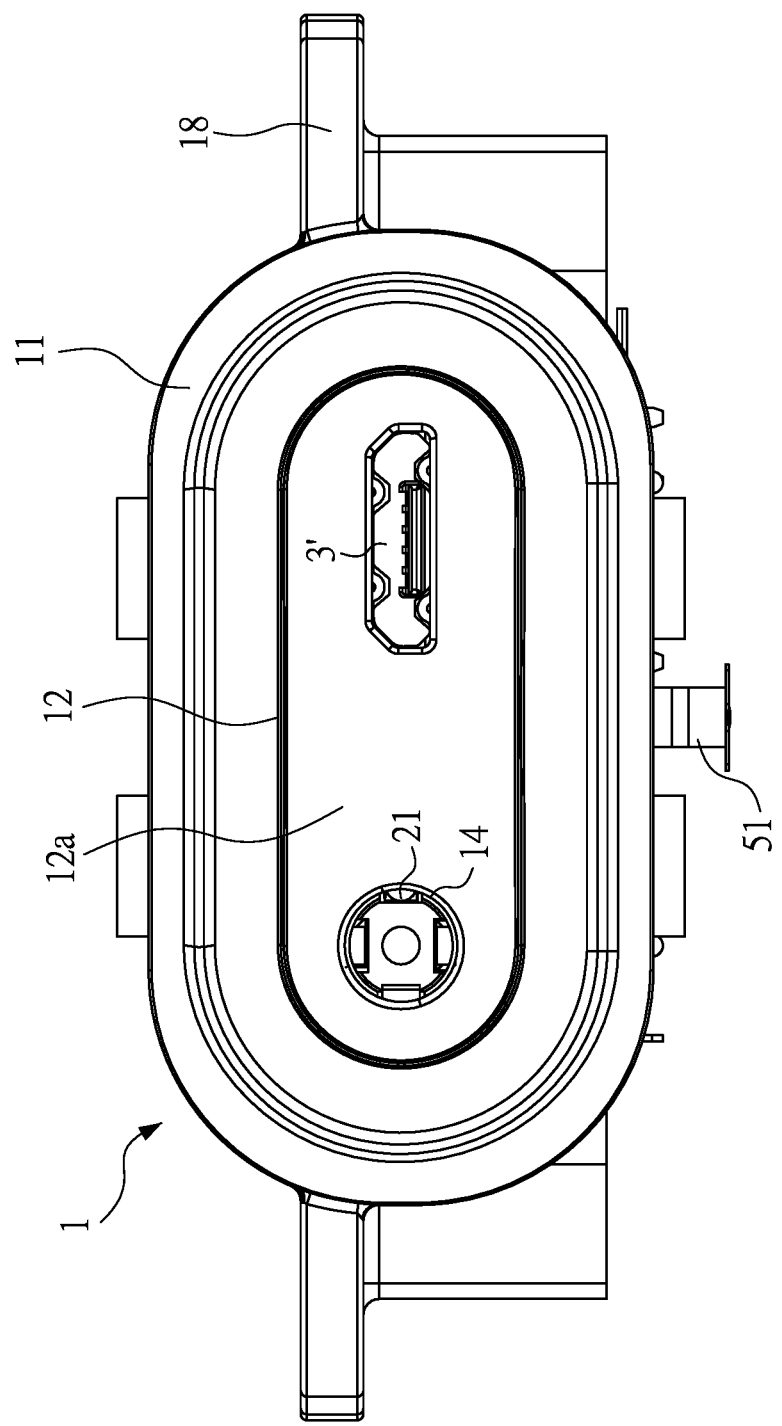
FIG. 6 illustrates a front view of the all-in-one electrical receptacle connector of the first embodiment.
Figure 7:
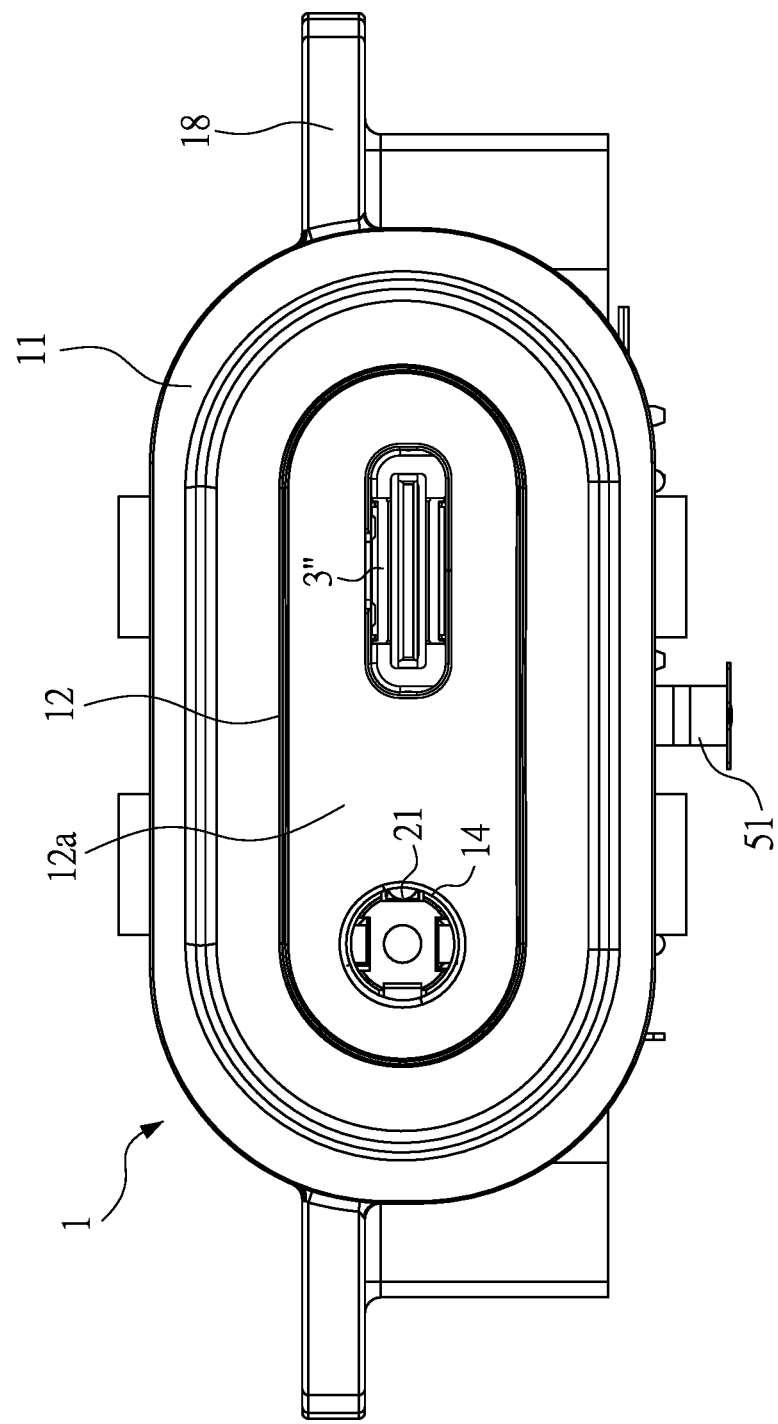
FIG. 7 illustrates a front view of an all-in-one electrical receptacle connector of a second embodiment of the instant disclosure.
Figure 9:
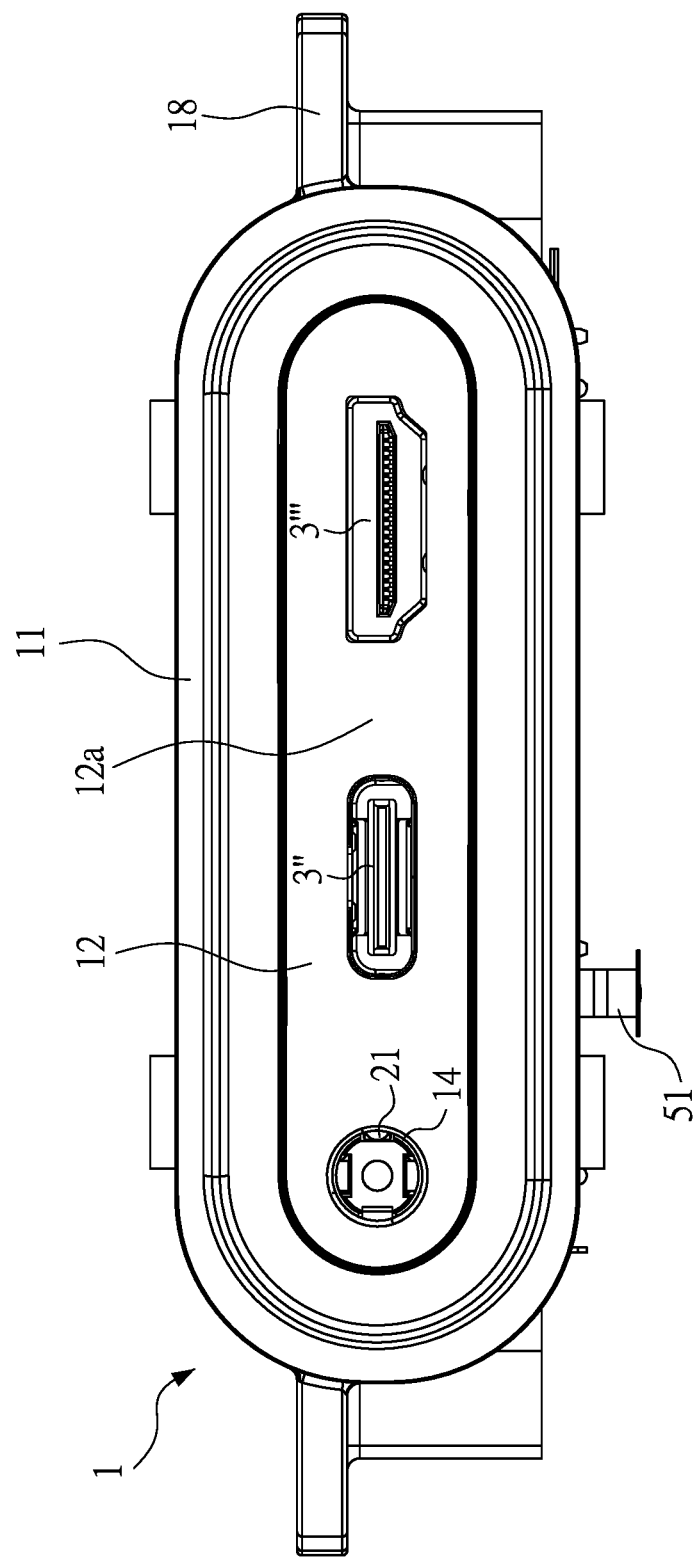
FIG. 9 illustrates a front view of an all-in-one electrical receptacle connector of a third embodiment of the instant disclosure.

Please refer to FIGS. 1, 2, 6, 7, and 9. FIG. 1 illustrates a front perspective view of an all-in-one electrical receptacle connector of a first embodiment of the instant disclosure. FIG. 2 illustrates an exploded view of the all-in-one electrical receptacle connector of the first embodiment. FIG. 6 illustrates a front view of the all-in-one electrical receptacle connector of the first embodiment. FIG. 7 illustrates a front view of an all-in-one electrical receptacle connector with a USB type-C connection interface. FIG. 9 illustrates a front view of an all-in-one electrical receptacle connector with an HDMI connection interface. In this embodiment, the all-in-one electrical receptacle connector is utilized to electronic products like, but not limited to, audios. According to one or some embodiments of the instant disclosure, the all-in-one electrical receptacle connector comprises an audio receptacle connector (audio jack) assembled with other connection interface, e.g., Micro USB, USB type-C, HDMI connection interfaces.

Please refer to FIGS. 1, 2, 6, 7, and 9. According to one or some embodiments of the instant disclosure, an audio connector body 1 is adapted to be assembled with different types of receptacle electrical connectors, so that an connector with widened and enlarged housing is provided for assembling with one or more different electrical receptacle connectors. Hence, two or more different connection interfaces can be provided for corresponding electrical plug connectors. In this embodiment, the audio connector body 1 is laid, and the audio connector component and the electrical connector are aligned next to each other in a transversal direction, but embodiments are not limited thereto. In one or some embodiments, the audio connector body is standing, and the audio connector component and the electrical connector are aligned next to each other in a vertical direction.

Figure 3:
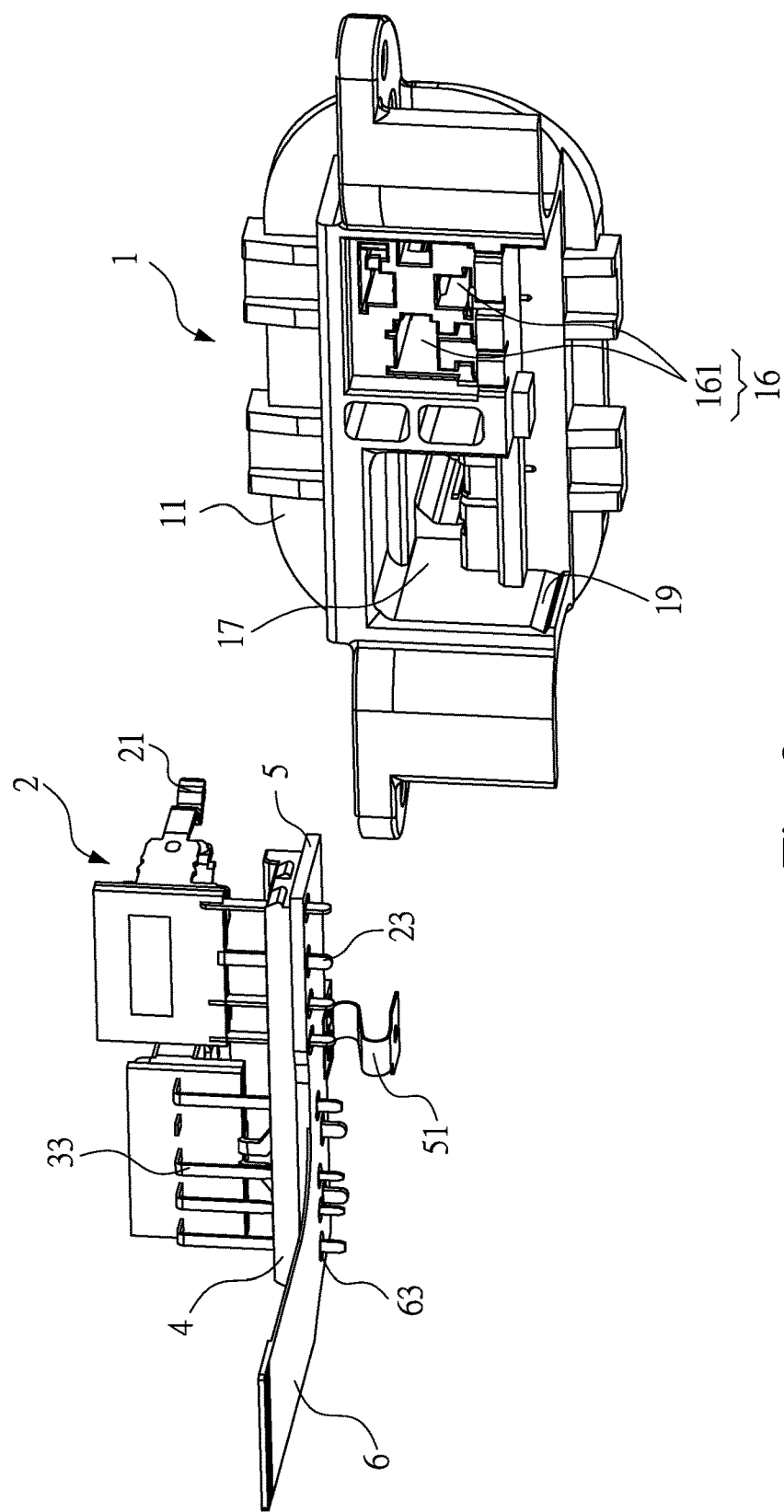
FIG. 3 illustrates a schematic exploded view from the back of the all-in-one electrical receptacle connector of the first embodiment.
Figure 5:
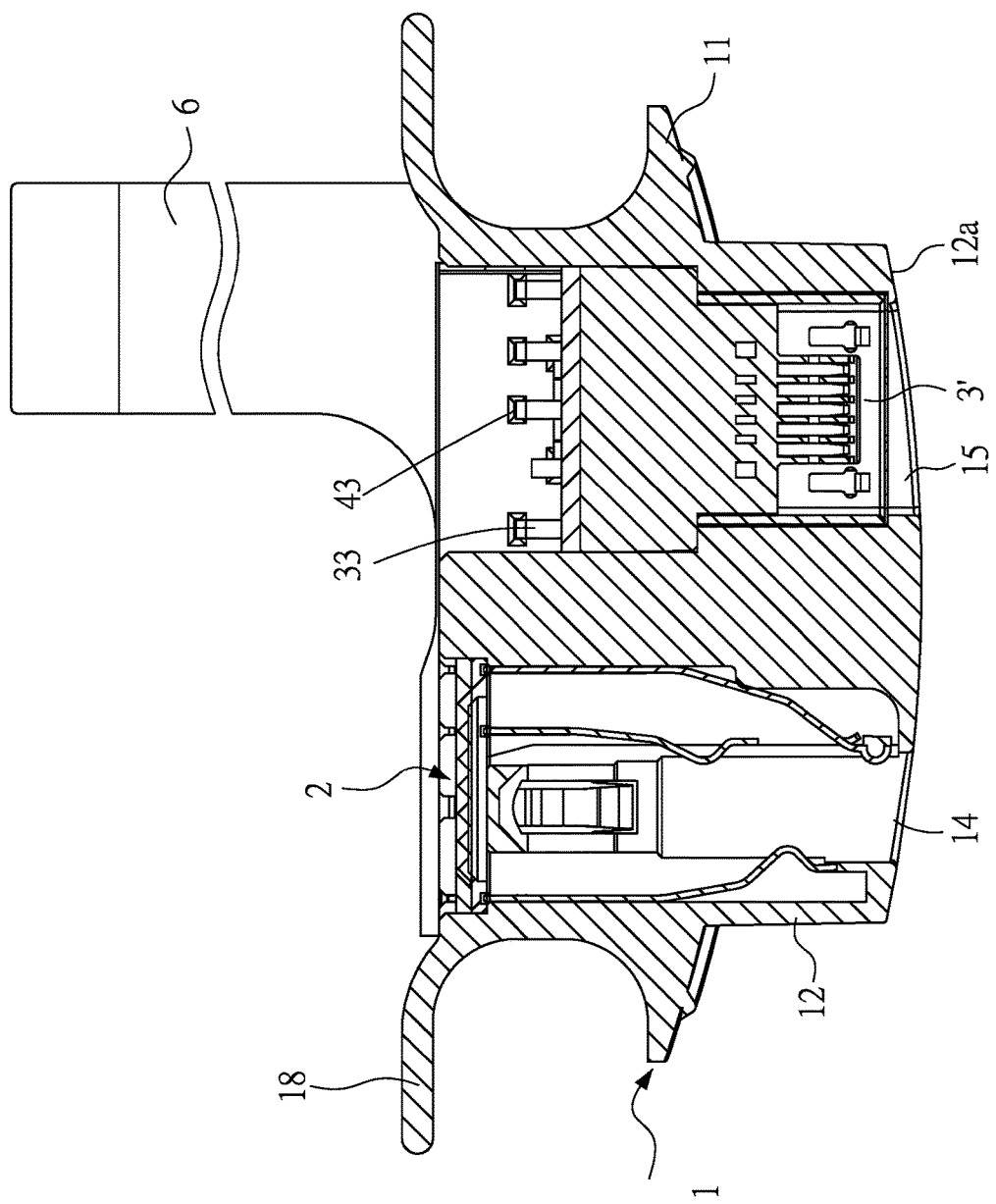
FIG. 5 illustrates a top sectional view of the all-in-one electrical receptacle connector of the first embodiment.

Please refer to FIGS. 2, 3, and 5. FIG. 3 illustrates a schematic exploded view from the back of the all-in-one electrical receptacle connector of the first embodiment. FIG. 5 illustrates a top sectional view of the all-in-one electrical receptacle connector of the first embodiment. In this embodiment, the audio connector body 1 is an insulated member made of plastic materials. The audio connector body 1 comprises a tubular portion 11 and a protruding block 12 outwardly extending from one of two ends of the tubular portion 11. The surface of the protruding block 12 forms an arced surface 12a.

Please refer to FIGS. 2, 3, and 5. In this embodiment, an audio insertion groove 14 and a connector insertion groove 15 are on a surface of the protruding block 12, and the connector insertion groove 15 is adjacent to the audio insertion groove 14. In this embodiment, the audio insertion groove 14 is a round-hole groove. An audio fixation groove 16 and a connector fixation groove 17 are on the other end of the tubular portion 11, and the connector fixation groove 17 is adjacent to the audio fixation groove 16. The audio fixation groove 16 is in communication with the audio insertion groove 14, and the connector fixation groove 17 is in communication with the connector insertion groove 15. The audio insertion groove 14 and the connector insertion groove 15 are arranged on the arced surface 12a. In this manner, when the audio connector body 1 is assembled in a mating cavity of the housing of an electronic product, the arced surface 12a is flush with the surface of the housing of the electronic product, and the protruding block 12 is not protruding out of the housing. Hence, the electrical product can have a smooth surface and a beautiful appearance.

Please refer to FIGS. 2, 3, and 5. In this embodiment, the audio fixation groove 16 forms a plurality of audio terminal grooves 161, and the audio terminal grooves 161 are in communication with the audio insertion groove 14. The audio terminal grooves 161 have different groove widths. The audio connector component 2 comprises a plurality of audio terminals 21 assembled in the audio terminal grooves 161. The audio connector component 2 is assembled and positioned in the audio fixation groove 16. In this embodiment, the audio connector component 2 comprises a plurality of audio terminals 21, and the audio terminals 21 are directly assembled in the audio terminal grooves 161. When a plug is inserted into the audio insertion groove 14, the plug is connected to the audio terminals 21.

Figure 8:
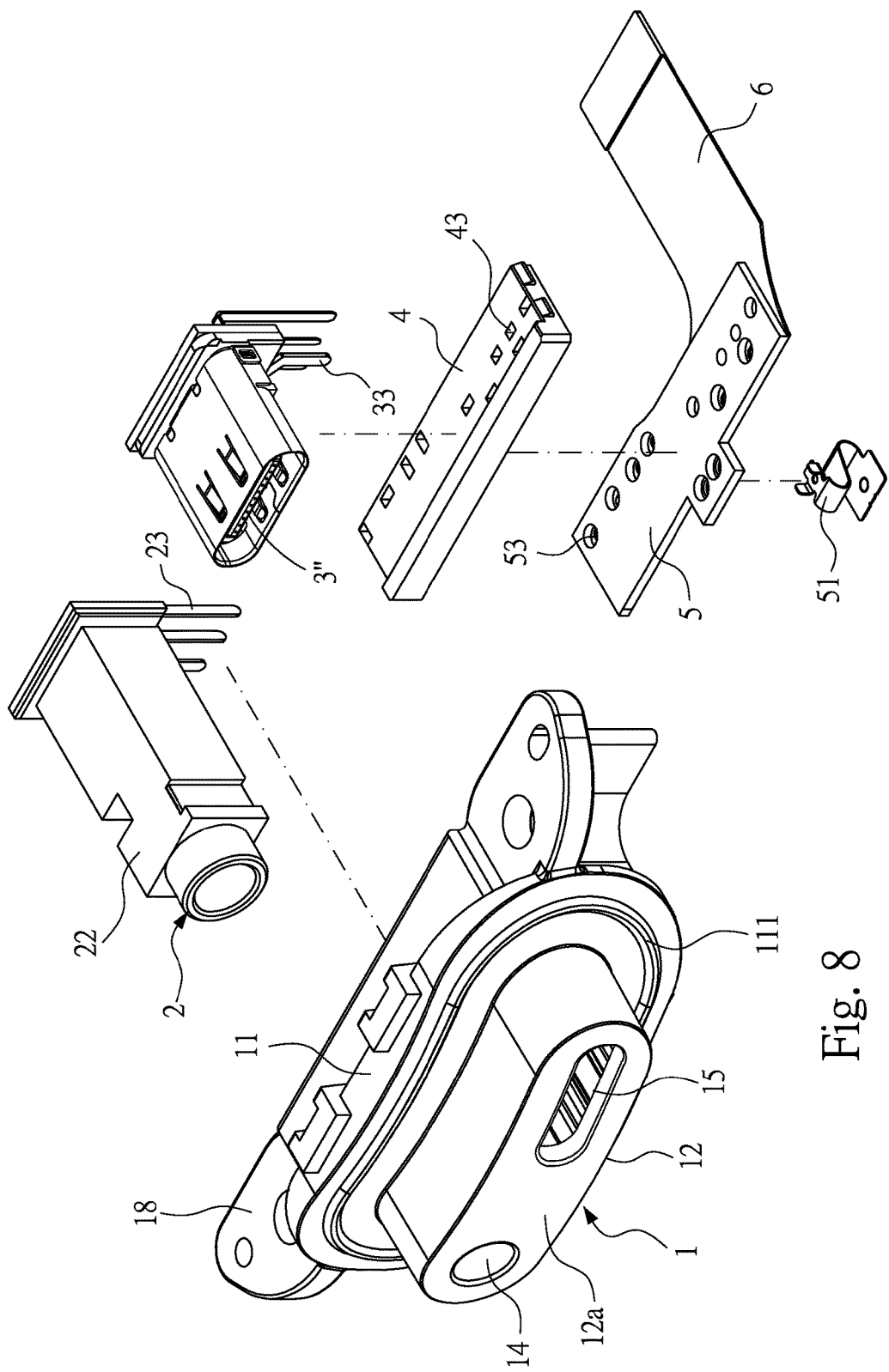
FIG. 8 illustrates an exploded view of the all-in-one electrical receptacle connector of the second embodiment.

In the foregoing embodiment, the audio terminals 21 are assembled in the audio terminal grooves 161, but embodiments are not limited thereto. In some embodiments, please refer to FIG. 8, illustrating an exploded view of the all-in-one electrical receptacle connector of the second embodiment. In this embodiment, the audio connector component 2 further comprises a housing 22, and the audio terminals 21 are assembled in the housing 22. On the other hand, the audio fixation groove 16 is a groove matched with the housing 22. Hence, when the housing 22 is assembled in the audio fixation groove 16, the audio insertion groove 14 can also be provided for the insertion of the plug to allow the connection between the audio terminals 21 in the housing 22 and the plug. In detail, the front ends of the audio terminals 21 are enclosed by the housing 22, and the rear ends are exposed out the housing 22 for soldering.

Please refer to FIGS. 2, 3, and 5. In this embodiment, the audio connector body 1 comprises a plurality of side wings 18 at two sides of the tubular portion 11. The side wings 18 have locking holes, and the locking holes correspond to locking posts of the electronic device. Therefore, locking members are inserted into the locking holes for positioning the audio connector body and the housing of the electronic product.

Figure 4:
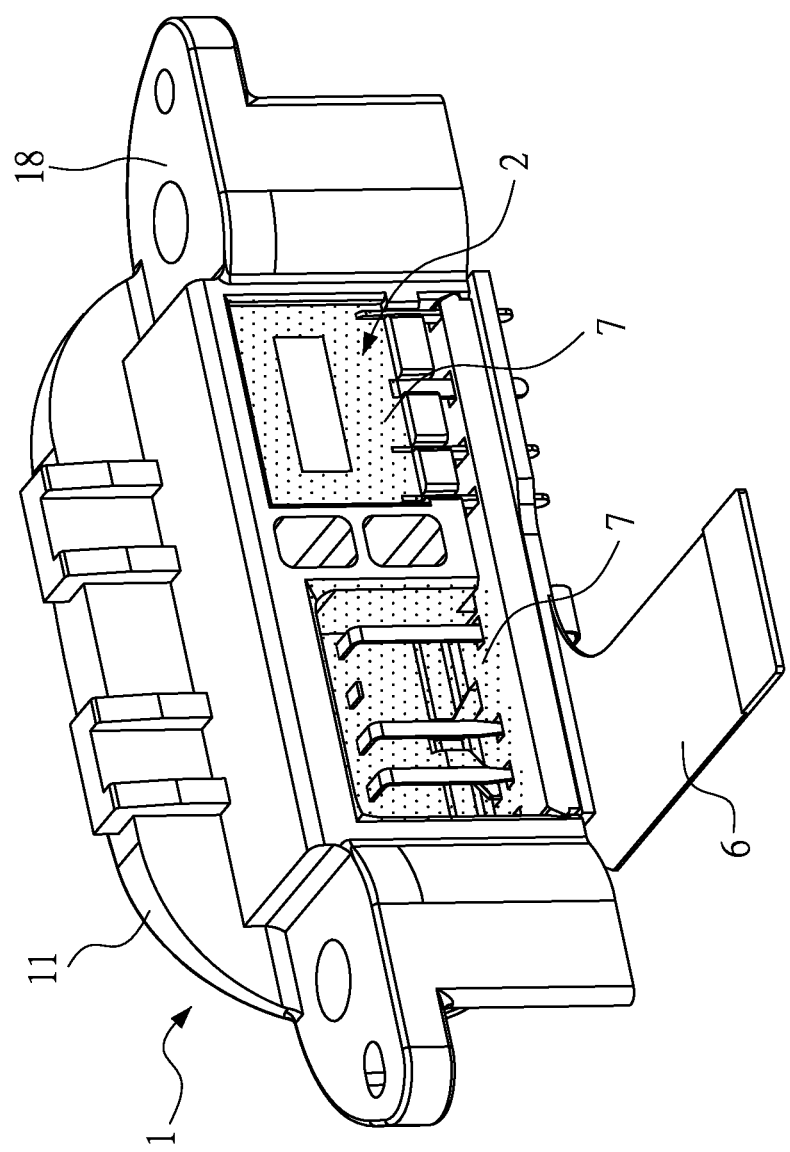
FIG. 4 illustrates a schematic assembled view of the back of the all-in-one electrical receptacle connector of the first embodiment.

Please refer to FIGS. 2 to 4. FIG. 4 illustrates a schematic assembled view of the back of the all-in-one electrical receptacle connector of the first embodiment. In this embodiment, the all-in-one electrical receptacle connector further comprises a separation board 4, a printed circuit board 5 (PCB), and a flexible board 6 stacked in order. The printed circuit board 5 is stacked on the flexible board 6, and the separation board 4 is stacked on the printed circuit board 5. A plurality of wires is disposed on the flexible board 6 (i.e., a flexible circuit board). One of two ends of the flexible board 6 is inserted into the motherboard of the electronic product. Therefore, because the flexible board 6 is flexible and bendable, the space inside the electronic product can be utilized properly. Furthermore, a bottom portion of the audio connector component 2 and a bottom portion of the electrical connector 3' are on the separation board 4. Pins 23 are extending from the bottom portion of the audio connector component 2, and pins 33 are extending from the bottom portion of the electrical connector 3'. Through holes 43 are on the separation board 4, through holes 53 are on the printed circuit board 5, and through holes 63 are on the flexible board 6. The pins 23 of the audio connector component 2 and the pins 33 of the electrical connector 3' are inserted into the through holes 43, 53, 63 and soldered with through holes for conduction.

Please refer to FIGS. 2 to 4. In this embodiment, the audio connector body 1 comprises a positioning groove 19 adjacent to a bottom portion of the audio fixation groove 16 and a bottom portion of the connector fixation groove 17. The separation board 4 is fixed in the positioning groove 19. Two walls at two sides of the positioning groove 19 have buckling grooves for being buckled by the two buckling blocks at two sides of the separation board 4.

Please refer to FIGS. 2 to 4. In this embodiment, the all-in-one electrical receptacle connector further comprises a connection sheet 51 connected to the printed circuit board 5. The connection sheet 51 is provided for contacting the motherboard of the electronic product for grounding and conduction.

Please refer to FIGS. 2 to 5. The all-in-one electrical receptacle connector further comprises a waterproof glue 7. The waterproof glue 7 is applied to fill into the space between the audio connector body 1, the audio connector component 2, and the electrical connector 3. In this embodiment, the waterproof glue 7 is at the audio fixation groove 16 and the connector fixation groove 17 for sealing the audio connector component 2 and the electrical connector 3. The waterproof glue 7 is applied on the audio fixation groove 16 and the connector fixation groove 17 at the back of the audio connector body 1 to seal the back portion of the audio connector component 2 and the back portion of the electrical connector 3. Hence, water moist is not allowed to enter into the audio fixation groove 16 and the connector fixation groove 17 at the back of the audio connector body 1 from the audio insertion groove 14 and the connector insertion groove 15 at the front of the audio connector body 1 and not to affect the operation of the components on the motherboard of the electronic product.

Please refer to FIGS. 2 to 5. The audio connector body 1 comprises a gasket ring 111 on a surface of the tubular portion 11, and the gasket ring 111 is around an outer periphery of the protruding block 12. In this embodiment, the gasket ring 111 and the tubular portion 11 are integrally formed as a whole, but embodiments are not limited thereto. In some embodiments, the gasket ring 111 and the tubular portion 11 are separated components and may be assembled with each other. When the audio connector body 1 is assembled in the mating cavity of the housing of an electronic product, the surface of the tubular portion 11 is abutted against an inner surface of the housing of the electronic product, and the gasket ring 111 is closely in contact with the inner surface of the housing of the electronic product. Hence, water moist is not allowed to enter into electronic product from the gap between the mating cavity and the audio connector body 1 and not to affect the operation of the components on the motherboard of the electronic product.

Please refer to FIGS. 2, 7, and 8, illustrating an all-in-one electrical receptacle connector of a second embodiment of the instant disclosure. In the first embodiment, the all-in-one electrical receptacle connector comprises an audio receptacle connector (audio jack) and an electrical connector 3' with a Micro USB connection interface; in the second embodiment, the all-in-one electrical receptacle connector comprises an audio receptacle connector and an electrical connector 3" with a USB type-C connection interface. Accordingly, receptacle connectors with different connection interfaces can be assembled in the audio connector body 1. Further, the size of the audio connector body 1 can be adjusted for accommodating receptacle connectors with different sizes.

Please refer to FIGS. 7 to 9. FIG. 9 illustrates an all-in-one electrical receptacle connector of a third embodiment of the instant disclosure. In the second embodiment, the all-in-one electrical receptacle connector comprises an audio receptacle connector and an electrical connector 3" with a USB type-C connection interface. In the third embodiment, the all-in-one electrical receptacle connector comprises an audio receptacle connector, an electrical connector 3" with a USB type-C connection interface, and an electrical connector 3'" with an HDMI connection interface to form a receptacle connector with three different connection interfaces. In some embodiments, the number of the connectors may be more than three. Accordingly, receptacle connectors with different connection interfaces can be assembled in the audio connector body 1. Further, the size of the audio connector body 1 can be adjusted for accommodating receptacle connectors with different sizes.

Please refer to FIGS. 2 and 3. In this embodiment, the audio terminals comprise elastic arms and pins 23. The elastic arms are extending toward the audio insertion groove 14, and the pins 23 are inserted into and soldered with the through holes 43 of the separation board 4 and the through holes 53 of the printed circuit board 5. The electrical connector 3' comprises the pins 33, and the pins 33 are inserted into the through holes 43 of the separation board 4 and the through holes 53 of the printed circuit board 5. In this embodiment, each of the electrical connectors mentioned above (with, e.g., Micro USB, USB type-C, HDMI connection interfaces) has an insulated housing and receptacle terminals on the insulated housing, and a metallic shell encloses the insulated housing.

Based on the above, according to one or some embodiments of the instant disclosure, the audio receptacle connector (audio jack) is assembled with receptacle connector(s) with different connection interfaces (e.g., Micro USB, USB type-C, HDMI) to have an all-in-one electrical receptacle connector including the audio receptacle connector and the electrical connector in the electronic product. Therefore, the waterproof function of the housing of the electronic product can be improved effectively. Further, as mentioned, the all-in-one electrical receptacle connector further comprises a flexible board. A plurality of wires is disposed on the flexible board (i.e., a flexible circuit board), and one of two ends of the flexible board is inserted into the motherboard of the electronic product. Therefore, because the flexible board is flexible and bendable, the space inside the electronic product can be utilized properly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An all-in-one electrical receptacle connector comprising:
an audio connector body comprising a tubular portion and a protruding block outwardly extending from one of two ends of the tubular portion, wherein an audio insertion groove and a connector insertion groove are on a surface of the protruding block, and the connector insertion groove is adjacent to the audio insertion groove; an audio fixation groove and a connector fixation groove are on the other end of the tubular portion, and the connector fixation groove is adjacent to the audio fixation groove; the audio fixation groove is in communication with the audio insertion groove, and the connector fixation groove is in communication with the connector insertion groove;
an audio connector component at the audio fixation groove;
an electrical connector at the connector fixation groove, wherein the electrical connector is a Micro USB electrical connector, a USB t e-C electrical connector, or a HDMI electrical connector;
a separation board, wherein the audio connector component and the electrical connector are on the separation board;
a printed circuit board stacked on the separation board; and
a flexible board stacked on the printed circuit board, wherein pins are extending from a bottom portion of the audio connector component and a bottom portion of the electrical connector, and through holes are on the separation board, the printed circuit board, and the flexible board for being inserted by and soldered with the pins.

2. The all-in-one electrical receptacle connector according to claim 1, wherein the surface of the protruding block forms an arced surface, and the audio insertion groove and the connector insertion groove are arranged on the arced surface.

3. The all-in-one electrical receptacle connector according to claim 2, wherein the audio fixation groove forms a plurality of audio terminal grooves being in communication with the audio insertion groove, the audio connector component comprises a plurality of audio terminals assembled in the audio terminal grooves.

4. The all-in-one electrical receptacle connector according to claim 2, wherein the audio connector component comprises a housing and a plurality of audio terminals assembled in the housing, the front ends of the audio terminals are enclosed by the housing, and the housing is assembled with the audio fixation groove.

5. The all-in-one electrical receptacle connector according to claim 2, wherein the audio connector body comprises a plurality of side wings at two sides of the tubular portion.

6. The all-in-one electrical receptacle connector according to claim 1, wherein the audio connector body comprises a positioning groove adjacent to a bottom portion of the audio fixation groove and a bottom portion of the connector fixation groove, and the separation board is fixed in the positioning groove.

7. The all-in-one electrical receptacle connector according to claim 1, further comprising a connection sheet connected to the printed circuit board.

8. The all-in-one electrical receptacle connector according to claim 1, further comprising a waterproof glue at the audio fixation groove and the connector fixation groove for sealing the audio connector component and the electrical connector.

9. The all-in-one electrical receptacle connector according to claim 1, wherein the audio connector body comprises a gasket ring on a surface of the tubular portion, and the gasket ring is around an outer periphery of the protruding block.

10. An all-in-one electrical receptacle connector comprising:
an audio connector body comprising a tubular portion and a protruding block outwardly extending from one of two ends of the tubular portion, wherein an audio insertion groove and a connector insertion groove are on a surface of the protruding block, and the connector insertion groove is adjacent to the audio insertion groove; an audio fixation groove and a connector fixation groove are on the other end of the tubular portion, and the connector fixation groove is adjacent to the audio fixation groove; the audio fixation groove is in communication with the audio insertion groove, and the connector fixation groove is in communication with the connector insertion groove;
an audio connector component at the audio fixation groove, wherein the audio connector component comprises a housing and a plurality of audio terminals assembled in the housing, the front ends of the audio terminals are enclosed by the housing and the housing is assembled with the audio fixation groove;
an electrical connector at the connector fixation groove;
a separation board, wherein the audio connector component and the electrical connector are on the separation board;
a printed circuit board stacked on the separation board; and
a flexible board stacked on the printed circuit board, wherein pins are extending from a bottom portion of the audio connector component and a bottom portion of the electrical connector, and through holes are on the separation board, the printed circuit board, and the flexible board for being inserted by and soldered with the pins.

11. The all-in-one electrical receptacle connector according to claim 10, wherein the surface of the protruding block forms an arced surface, and the audio insertion groove and the connector insertion groove are arranged on the arced surface.

12. The all-in-one electrical receptacle connector according to claim 11, wherein the audio fixation groove forms a plurality of audio terminal grooves being in communication with the audio insertion groove, the audio connector component comprises a plurality of audio terminals assembled in the audio terminal grooves.

13. The all-in-one electrical receptacle connector according to claim 11, wherein the audio connector body comprises a plurality of side wings at two sides of the tubular portion.

14. The all-in-one electrical receptacle connector according to claim 10, wherein the audio connector body comprises a positioning groove adjacent to a bottom portion of the audio fixation groove and a bottom portion of the connector fixation groove, and the separation board is fixed in the positioning groove.

15. The all-in-one electrical receptacle connector according to claim 10, further comprising a connection sheet connected to the printed circuit board.

16. The all-in-one electrical receptacle connector according to claim 10, further comprising a waterproof glue at the audio fixation groove and the connector fixation groove for sealing the audio connector component and the electrical connector.

17. The all-in-one electrical receptacle connector according to claim 10, wherein the audio connector body comprises a gasket ring on a surface of the tubular portion, and the gasket ring is around an outer periphery of the protruding block.

\* \* \* \* \*